T. J. FAY & W. E. HOPKINS.
COLLAPSIBLE GO-CART.
APPLICATION FILED MAR. 26, 1908.
906,621.
Patented Dec. 15, 1908.
2 SHEETS—SHEET 2.
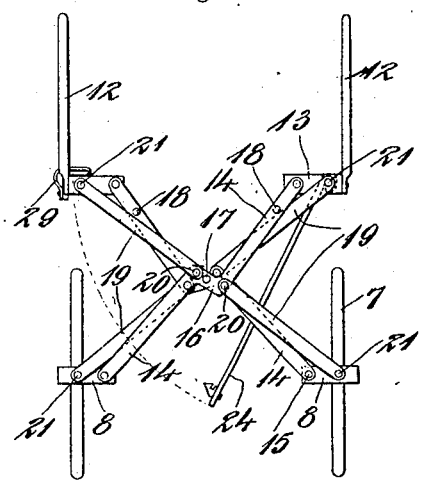
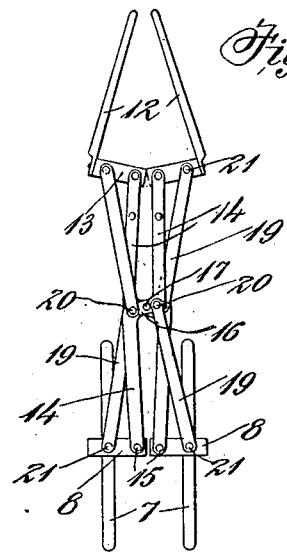
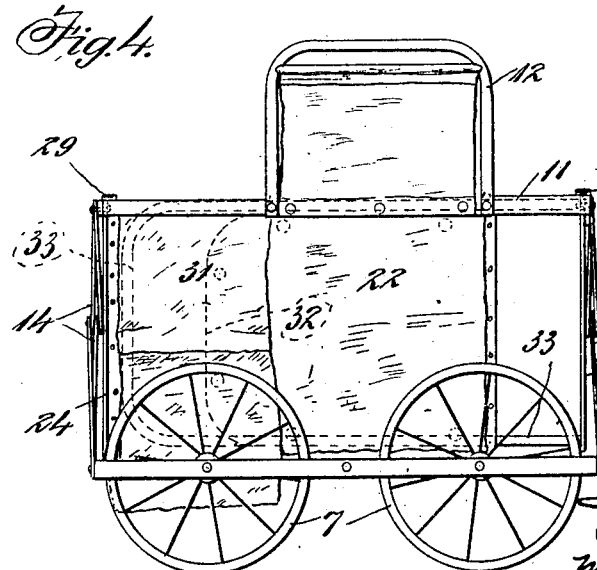
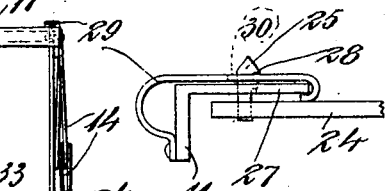

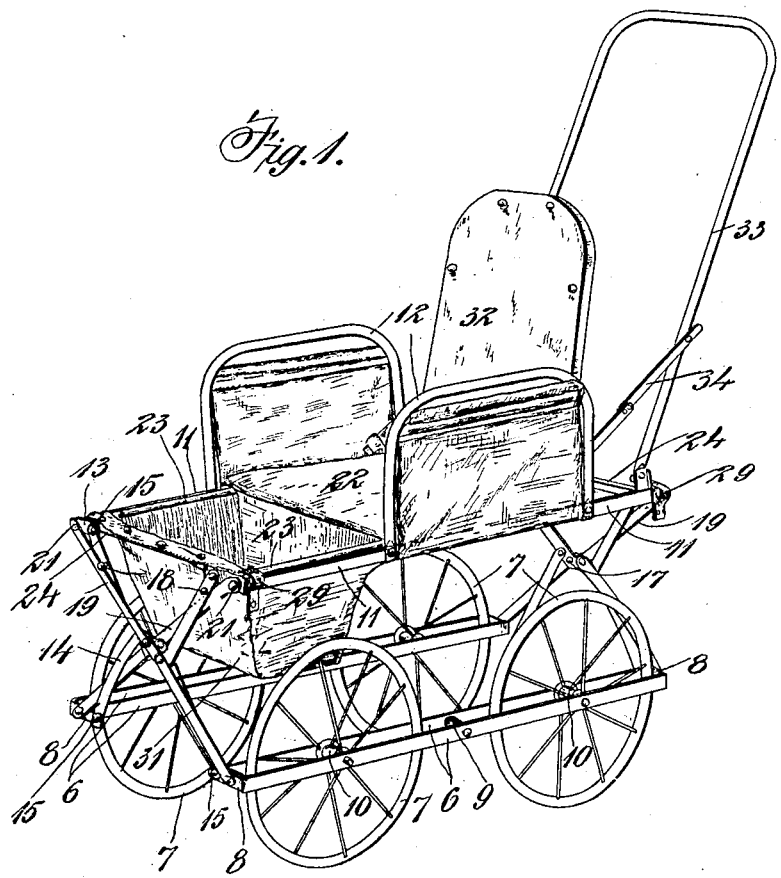

UNITED STATES PATENT OFFICE.

THOMAS J. FAY, OF CHICAGO, AND WILLIAM E. HOPKINS, OF OAK PARK, ILLINOIS.

COLLAPSIBLE GO-CART.

No. 906,621. Specification of Letters Patent. Patented Dec. 15, 1908.

Application filed March 26, 1908. Serial No. 423,457.

*To all whom it may concern:*

Be it known that we, THOMAS J. FAY and WILLIAM E. HOPKINS, citizens of the United States, residing at Chicago and Oak Park, respectively, in the county of Cook and State of Illinois, have invented certain new and useful Improvements in Collapsible Go-Carts, of which the following is a specification.

This invention relates to children's carriages or go-carts of the collapsible type, the object being to provide an improved cart which when folded will occupy but little space and which when unfolded will stand rigidly and be of such construction that a child can either sit or recline therein.

The invention is illustrated in the accompanying drawings, in which—

Figure 1 is a perspective view of the cart in condition for use. Fig. 2 is a front view of the running and supporting gear, in unfolded position. Fig. 3 is a front view of the same parts in folded position. Fig. 4 is a side view of the cart when folded. Fig. 5 is a detail of the catch for the bottom of the body.

The running gear comprises or includes a pair of side frames for supporting the wheels, each frame consisting of two parallel bars 6 spaced apart a sufficient distance to contain the wheels 7 therebetween, the bars being connected at their ends by short cross pieces 8 and at the middle by a brace 9, the wheels being mounted on short axles 10 extending between the bars. A stout and rigid support is thus provided for the wheels, which are at all times retained in a position to track and the cart will always run in a straight line.

The body of the cart has at each side a slide bar 11 to which the arm rests 12 are fixed, these arm rests each comprising an arched rod or tube connected at its ends to the bar. At its ends each bar is offset inwardly, as indicated at 13, to correspond to the pieces 8, and to form places for the attachment of the folding links, which are so constructed that the side frames of the running gear and the body may be moved laterally toward or from each other to fold or unfold the cart. The links are similar at each end of the cart.

Each set of links comprises long crossed links 14 which extend diagonally from one of the pieces 8 to the piece 13 on the opposite side, said links being pivoted at 15 to or near the extremities of said pieces. Each link has a double elbow 16 at the middle, and they are pivoted together between the elbows, as at 17, and each link has near the upper end a projecting stud or knob 18 by means of which the links are manipulated. The long or double links above described are also connected to the frames by short or single links 19 each of which is pivotally connected, as at 20, to one of the elbows of the long links and also pivotally connected to the pieces 8 and 13, as indicated at 21, and these links act to stiffen and brace the long links and to hold the bars of the frame in upright or relatively parallel position when the cart is unfolded. The pivotal connections 20 of the lower links 19 are arranged at equal distances from the center 17, and the corresponding pivotal connections of the upper links 19 are also arranged at equal distances from said center, and when the parts are folded the said pivotal points describe concentric arcs around said center, whereby the cart can be folded or collapsed until the side frames of the running gear and the side frames of the body are close together, as shown in Fig. 3.

The seat or bottom of the body is indicated at 22 and it is mounted upon a frame consisting of side bars 23 and end bars 24, which frame is hinged at its ends, on one side, to the end pieces 13 of the side frame 11, the hinge being effected by the pivot bolts 21 of the upper short links on that side. The seat frame is thus in position to swing up or down, as shown in Fig. 2, and the free or swinging side is held in raised position by means of catches one of which is shown particularly in Fig. 5. Each catch consists of a pointed pin 25 projecting upwardly from the bar 24 near the end thereof and adapted to enter a hole in a flange 27 projecting from the end of the side bar 11, and the pin is notched as at 28, said notch being engageable by a spring latch or piece consisting of a flat spring 29 secured to the side bar and having a hole 30 through which the end of the pin 25 snaps, and said spring engages in the notch 28 and thus holds the seat frame in horizontal position as well as assisting in holding the side frames together and sustaining the part in unfolded condition. There is one of the catches at each end of the seat frame.

At the front end the seat frame has a foot rest or pocket 31 formed of flexible material such as leather or canvas. The back 32 is hinged at its lower end to the seat board 22 and will fold down forwardly upon the same. The handle 33, consisting conveniently of a bent rod or piece of pipe is hinged to lugs on the rear bar 24 of the seat frame, and it is supported by folding braces 34, which will flex to allow said handle to be folded down beside the back and upon the seat frame; and when said seat frame is dropped, as shown in Fig. 2, the seat, back and handle, being folded down thereon, drop into the space between the side frames.

The cart is collapsed by folding down the back and handle as stated and by releasing the spring catches, after which the sides can be drawn together and closed or collapsed, in which condition the cart will occupy but little space and can be set close to a wall, or in a hall or the like, without inconvenience.

We claim:

1. In a folding carriage, the combination of a running gear frame and a body frame, each consisting of two side parts movable laterally toward and from each other, crossed links connecting said frames at front and rear, and bracing links pivotally connected between said links and the frames.

2. In a folding carriage, the combination of a running gear frame and a body frame, each consisting of two side parts movable laterally toward and from each other, crossed links connecting said frames at front and rear, said links having double elbows at the middle, and links pivotally connected between said frames and the elbows of the links respectively.

3. In a folding carriage, the combination of a running gear frame and a body frame each consisting of two longitudinal side bars with angular offsets at their ends, said frames being movable laterally toward and from each other, crossed links pivotally connected at their opposite ends to the said offsets and having double elbows, said links being pivoted together between their elbows, and short links pivotally connected to said offsets and elbows.

4. In a folding carriage, the combination of side frames movable toward and from each other, extensible connections between said frames, a seat frame hinged to one side frame, and a catch engageable between the seat frame and the other side frame, a foldable back hinged to the rear of the seat and a handle hinged to the rear of the seat frame.

In testimony whereof we affix our signatures, in presence of two witnesses.

THOMAS J. FAY.
WILLIAM E. HOPKINS.

Witnesses:
NELLIE FELTSKOG,
H. G. BATCHELOR.